(12) United States Patent
Rein et al.

(10) Patent No.: US 7,490,556 B2
(45) Date of Patent: Feb. 17, 2009

(54) CABLEWAY INSTALLATION WITH ROTATABLE CABLEWAY TRANSPORT DEVICES

(75) Inventors: Christian Rein, Dornbirn (AT); Thomas Stefani, Kennelbach (AT)

(73) Assignee: Innova Patent GmbH, Wolfurt (AT)

( * ) Notice: Subject to any disclaimer, the term of this patent is extended or adjusted under 35 U.S.C. 154(b) by 368 days.

(21) Appl. No.: 11/430,505

(22) Filed: May 9, 2006

(65) Prior Publication Data

US 2007/0068416 A1     Mar. 29, 2007

(30) Foreign Application Priority Data

Sep. 27, 2005   (AT)  .............................. A 1583/2005

(51) Int. Cl.
*B61B 15/00*   (2006.01)
(52) U.S. Cl. ........................................................ 104/87
(58) Field of Classification Search ................... 104/28, 104/87, 173.1, 178, 179
See application file for complete search history.

(56) References Cited

U.S. PATENT DOCUMENTS 3,541,962 A * 11/1970 Avery ............................ 104/25
4,627,361 A * 12/1986 Tarassoff ....................... 104/28
5,105,745 A * 4/1992 Tarassoff ...................... 104/178
6,202,563 B1 * 3/2001 Tarassoff et al. ............... 104/28
6,862,998 B2 * 3/2005 Doppelmayr ............. 105/149.1

FOREIGN PATENT DOCUMENTS

EP       1 419 950 A1    5/2004

* cited by examiner

*Primary Examiner*—S. Joseph Morano
*Assistant Examiner*—Daniel V Venne
(74) *Attorney, Agent, or Firm*—Laurence A. Greenberg; Werner H. Stemer; Ralph E. Locher (57) ABSTRACT

A cableway installation has a suspension and hauling cable with transport devices such as cableway gondolas, lift chair, or the like, which are capable of being disconnected from the suspension and hauling cable in the stations. There, they are conveyed along guide rails through the stations and subsequently reconnected to the suspension and hauling cable. The transport devices can be caused to rotate in relation to the suspension rods about an approximately vertical axis by way of a turntable drive unit. A detector device is disposed in the entry area to the stations, by way of which the rotational position of the transport devices is monitored as they enter the stations and switching-off of the cableway gondola installation is occasioned in the event that a preset value for the rotational position is exceeded.

15 Claims, 8 Drawing Sheets

CABLEWAY INSTALLATION WITH ROTATABLE CABLEWAY TRANSPORT DEVICES

BACKGROUND OF THE INVENTION

Field of the Invention

The invention lies in the field of cableway systems and pertains, in particular, to a cableway installation with rotatable transport means such as gondolas, lift chairs, and the like.

The cableway installation of the present invention has a suspension and hauling cable, which is led over deflector pulleys in the terminals, and having cableway gondolas and lift chairs or the like, which are located at the lower end of suspension rods. These transport means are capable of being disconnected from the suspension and hauling cable in the stations, which are capable of being conveyed in the stations along guide rails through the exit and entry areas and subsequently of being reconnected to the suspension and hauling cable, and which are supported in such a way as to be capable of being caused to rotate in relation to the suspension rods about an approximately vertical axis, in conjunction with which they are embodied with a turntable drive unit which is controlled via a control unit provided on the cableway gondolas.

Commonly assigned prior U.S. Pat. No. 6,862,998 B2 and its counterpart European published patent application EP 1419950 A1 describe a cableway installation that is embodied with transport means which are supported in such a way as to be capable of being caused to rotate about an approximately vertical axis in relation to the suspension rods. The transport means are capable of being connected to the suspension and hauling cable. In a cableway installation of this kind, it is necessary to ensure that the cableway transport means are situated in the rotational position required for leaving or boarding in the stations wherein the passengers can disembark and board them.

SUMMARY OF INVENTION

It is accordingly an object of the invention to provide a cableway installation with rotatable cableway transport devices which overcomes the above-mentioned disadvantages of the heretofore-known devices and methods of this general type and which assures proper angular positioning and alignment of the transport devices for transport and for passenger exchange. With the foregoing and other objects in view there is provided, in accordance with the invention, a cableway installation, comprising:

- a suspension and hauling cable guided about deflector pulleys in stations of the cableway installation;
- transport devices attached to said suspension and hauling cable via respective suspension rods, said suspension rods being configured to be selectively disconnected from said suspension and hauling cable in the stations;
- guide rails disposed to guide said transport devices through the stations along exit and entry areas, for subsequent reconnection to the suspension and hauling cable;
- a turntable drive unit disposed to enable said transport devices to be rotated relative to said suspension rods about a substantially vertical axis; and
- a control unit disposed in a respective said transport device for controlling said turntable drive unit;
- a detector device disposed in an entry area to the stations for monitoring a rotational position of said transport devices upon entering the stations and connected to cause the cableway installation to be stopped when a preset value for the rotational position of a transport device is exceeded.

In other words, the objects of the invention are achieved in that a detector device is arranged in the entry area to the stations, by means of which detector device the rotational position of the cableway gondolas is monitored as they enter the stations, and by means of which switching-off of the cableway gondola installation is occasioned in the event of a preset value for the rotational position of the cableway gondola in question being exceeded.

Preferably provided in the exit area from the stations is a first switching element, by means of which the control unit is capable of being actuated in conjunction with the departure of a cableway gondola from the stations, in order to switch on the turntable drive unit. Provided as an alternative thereto is a wireless control device, by means of which the control unit is capable of being actuated in conjunction with the departure of a cableway gondola from the stations, in order to switch on the turntable drive unit.

Preferably provided for the cableway gondolas that are capable of being rotated about a vertical axis is a first control element, to which the first switching element is allocated in the exit area from the stations, by means of which, when it projects into the movement path of the control element, the first control element is displaced, whereby a signal is generated to the control unit that is present in the cableway gondola, by means of which signal a rotation of the cableway gondola is occasioned. In conjunction with this, an positioning device, in particular a stepping motor, can be allocated to the first switching element that is present in the exit area from the stations, by means of which positioning device this switching element is capable of being displaced into a first position outside the movement path of the first control element and into a second position inside the movement path of the first control element.

The cableway gondolas that are embodied with a turntable drive unit are preferably embodied in addition with at least a second switching element, to which, a second control element is allocated in the entry area to the stations, in conjunction with which, in a rotational position of the cableway gondolas corresponding to one of the requirements, the second switching element interacts with the second control element. The cableway gondolas that are embodied with a turntable drive unit are preferably embodied with two switching elements, and a second control element in each case is preferably allocated to each of these switching elements in the entry area to the stations.

According to a further preferred embodiment, the cableway gondolas are guided in the stations by means of guide rails that are present in the vicinity of the ground, in conjunction with which the cableway gondolas are preferably embodied with at least one guide roller or the like, to which a guide rail is allocated in the stations, with which the guide roller or the like interacts.

According to a further preferred embodiment, the first control element is in the form of a switch bar projecting from the cableway gondola, the swinging of which causes a control signal to be generated to the control unit provided in the cableway gondola, and the second switching elements provided on the cableway gondolas are formed by switch bars or the like projecting downwards from these, present in the movement paths of which are second control elements that are provided in the entry area to the stations, which are capable of actuation by these switch bars or the like.

Other features which are considered as characteristic for the invention are set forth in the appended claims.

Although the invention is illustrated and described herein as embodied in a cableway installation with rotatable cableway transport means it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
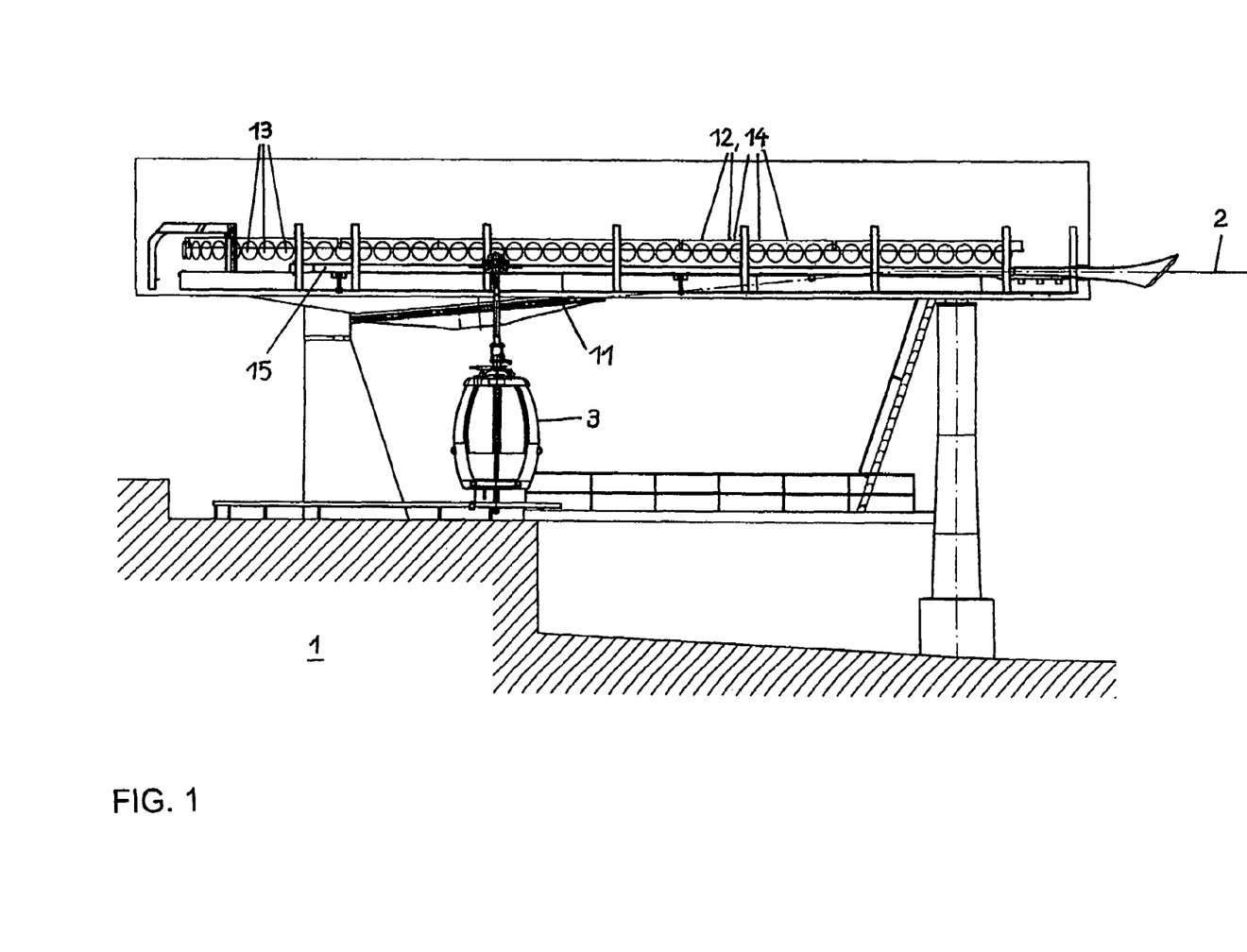
FIG. 1 is a side view of a cableway station.
Figure 2:
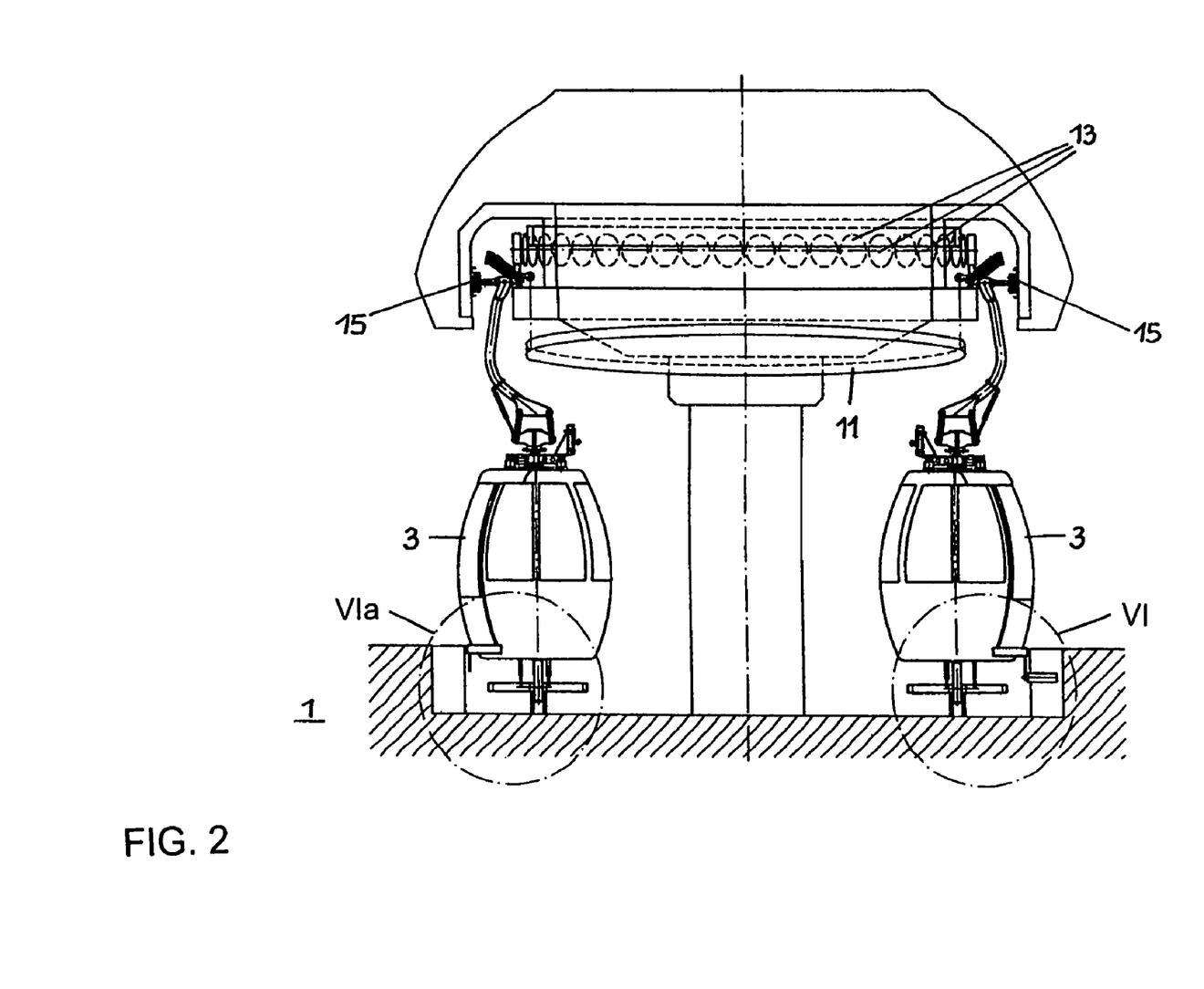
FIG. 2 shows the cableway station in accordance with FIG. 1, viewed in one of the directions of movement of the cableway gondolas.
Figure 3:
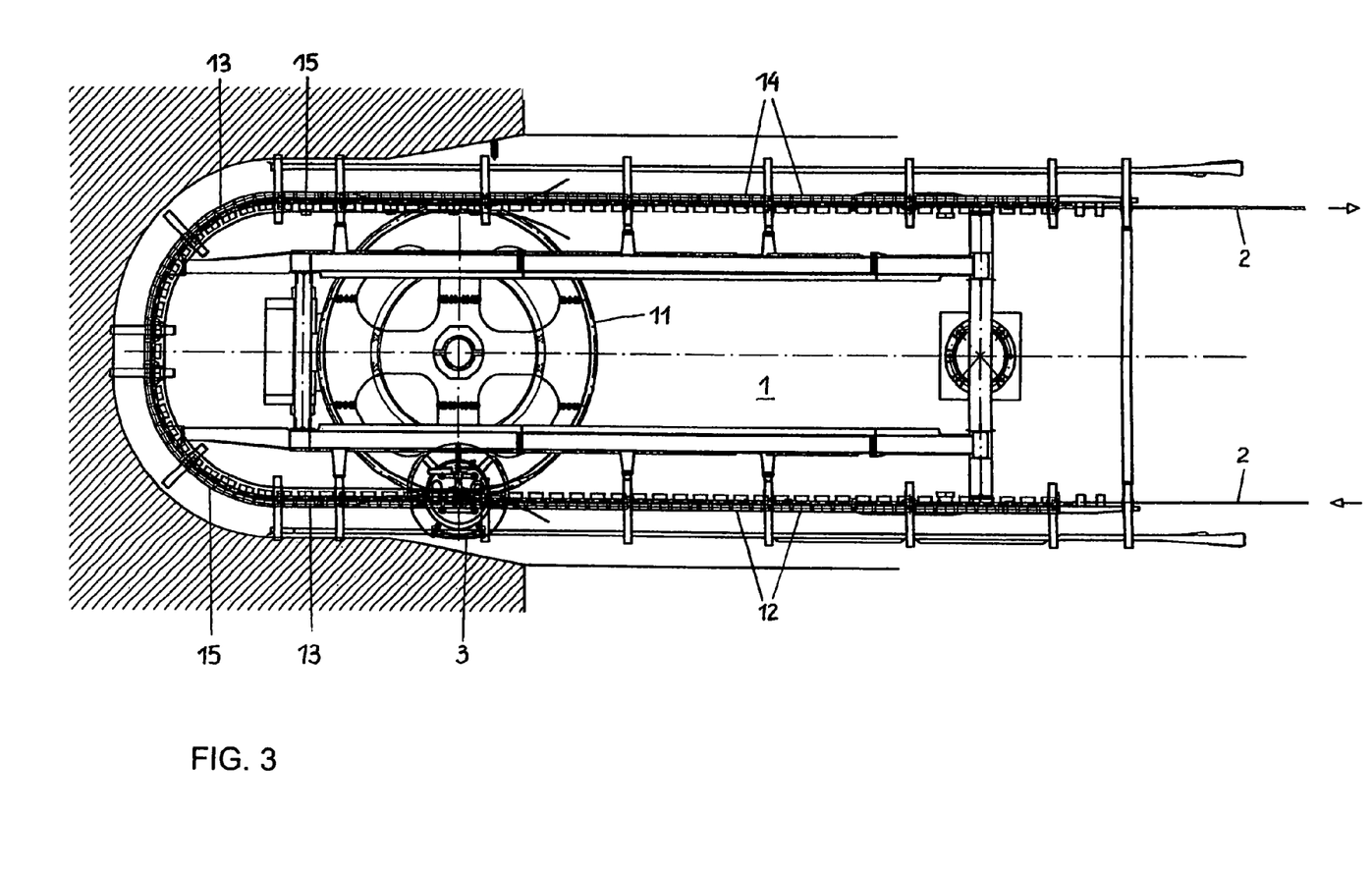
FIG. 3 shows the cableway station in accordance with FIGS. 1 and 2 as a view from above.

Referring now to the figures of the drawing in detail and first, particularly, to FIGS. 1, 2, and 3 thereof, a deflector pulley or return pulley 11 (also referred to as a head wheel) is located in the station 1. The pulley 11 guides a suspension and haulage cable 2, to which cableway gondolas 3 or similar transport devices are capable of being connected, and by means of which they are caused to move from a first station to a second station. In the vicinity of the stations, groups of deceleration wheels 12, hauling wheels 13 and acceleration wheels 14, as well as guide rails 15, are provided in each case on a supporting structure.

In the stations, whether they be terminal stations or intermediate stations, the cableway gondolas 3 are disconnected from the suspension and hauling cable 2 and are conveyed through the stations along the guide rails 15 by way of the deceleration wheels 12, the hauling wheels 13, and then the acceleration wheels 14. During that time, the passengers may board or disembark from the gondolas 3, or any other transport device, such as chairs, or the like.

Figure 4:
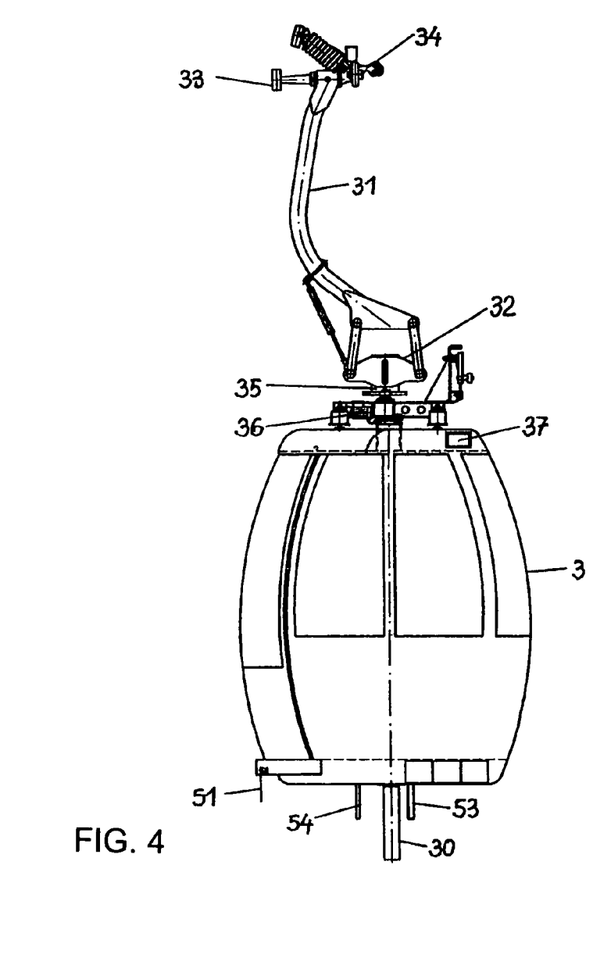
FIG. 4 is a front view of an exemplary cableway gondola.
Figure 4A:
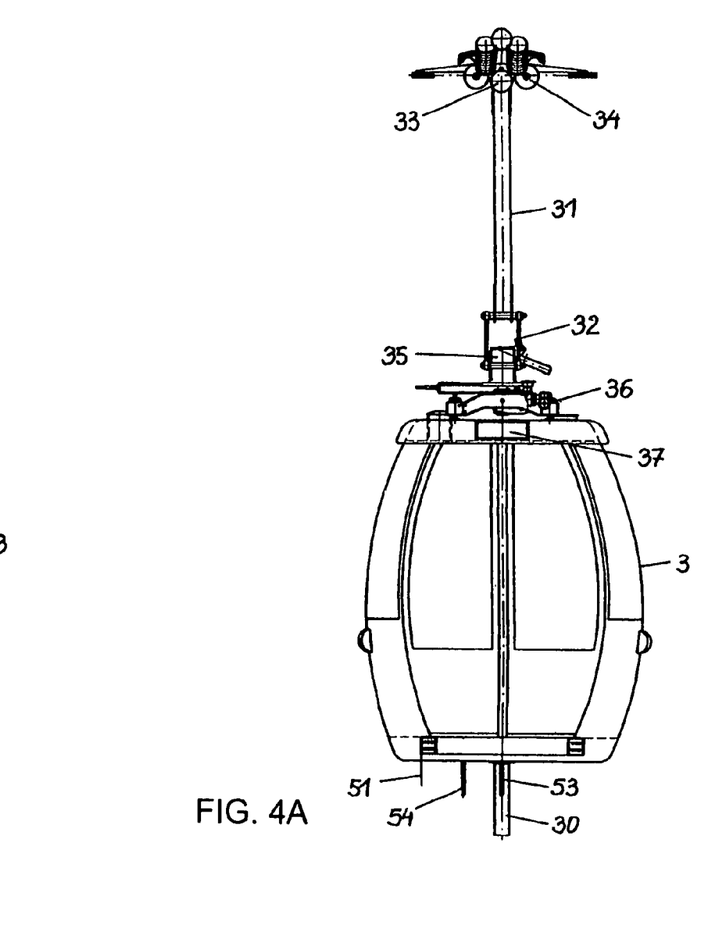
FIG. 4a is a side view thereof.

As can be appreciated from FIG. 4 and FIG. 4A, the individual cableway gondolas 3 are attached to the lower end of a suspension rod 31 by means of a suspension device 32 in a manner wherein they are able to swing in a vertical plane. Situated at the upper end of the suspension rod 31 are a travelling gear 33 and a coupling device 34, by means of which the cableway gondolas 3 are capable of being connected to the suspension and hauling cable 2. Present in the suspension device 32 is a bearing 35, wherein the cableway gondola 3 is capable of being caused to rotate about a vertical axis by means of a drive motor 36. Also provided in the cableway gondola 3 is a control unit 37 for the control of the drive motor 36. Finally, the cableway gondola 3 is embodied with a first control element 51 for the application to the control unit 37 of a switching signal, and with switching elements 53, 54. A first switching element is allocated to the first control element 51 in the area of the exit from the stations 1, and second control elements that are present in the area of the entry to the stations 1 are allocated to the second switching elements 53, 54.

The first control element consists of a downward-projecting switch bar 51 in the lower area of one of the lateral external walls of the cableway gondola 3, which switch bar is capable of rotating about a horizontal axis. The second switching elements consist of two switch rods 53 and 54 projecting downwards from the floor of the cableway gondola 3.

A guide roller 30 also projects vertically downwards from the floor of each cableway gondola 3, to which roller guide rails that are present in the stations are allocated.

Figure 5:
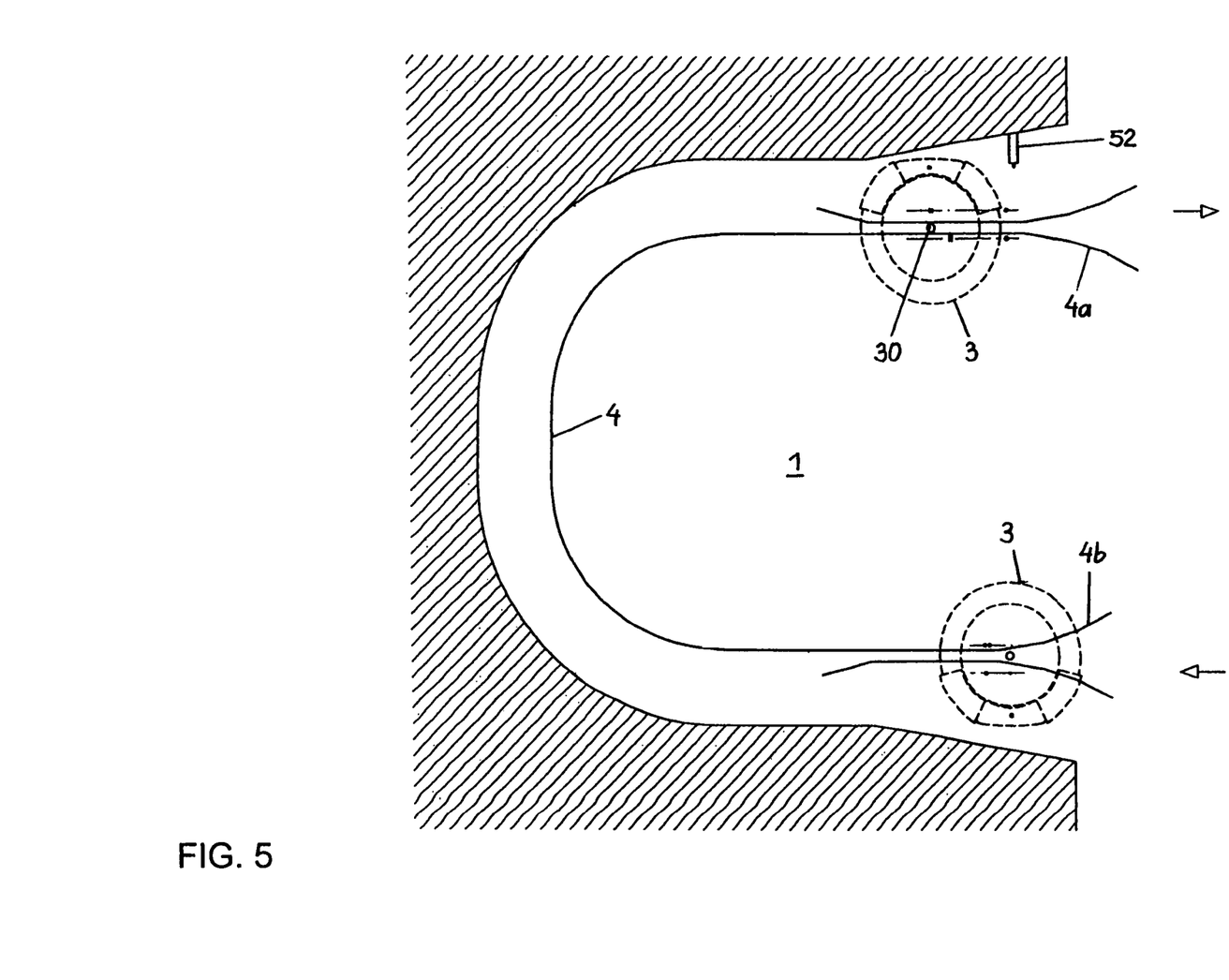
FIG. 5 is a top plan view of the cableway station of FIGS. 1 and 2, on another level.

As can be appreciated from FIG. 5, every station 1 is provided with a guide rail 4 in the vicinity of the ground, along which the cableway gondolas 3 are guided by means of the guide rollers 30 during their movement through the station 1. In the areas of the exit from the stations 1 and the entry of the cableway gondolas 3 into the stations 1, the guide rails 4 are embodied with funnel-like extensions 4a and 4b. In addition, the switching elements and control elements allocated to the cableway gondolas 3 are provided in the areas of the exit from the stations 1 and the entry into the stations 1, which elements interact with the switch bar 51 provided on the cableway gondolas 3 and with the switch rods 53 and 54, and by means of which the rotating movement of the cableway gondolas 3 as they exit from the stations 1 is controlled and the rotational position of the cableway gondolas 3 as they enter the stations 1 is verified, in conjunction with which, in the event of the cableway gondolas 3 being in rotational positions that do not-correspond to the requirements, switching off of the cableway installation is occasioned.

In the area of the exit, the first switching element is formed by a stop 52, which interacts with the switch bar 51.

Figure 6:
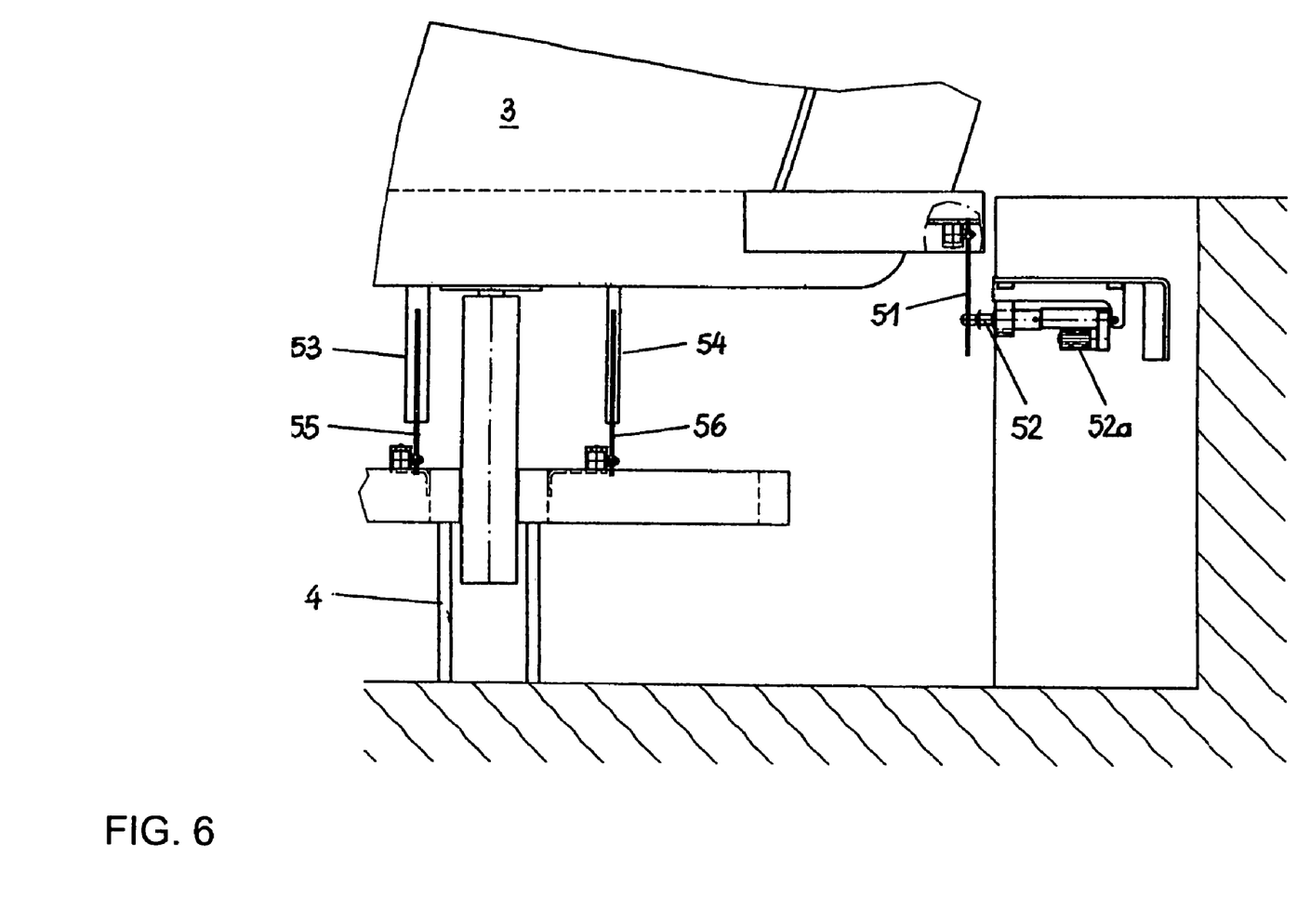
FIG. 6 is an enlarged view of detail VI in FIG. 2.
Figure 6A:
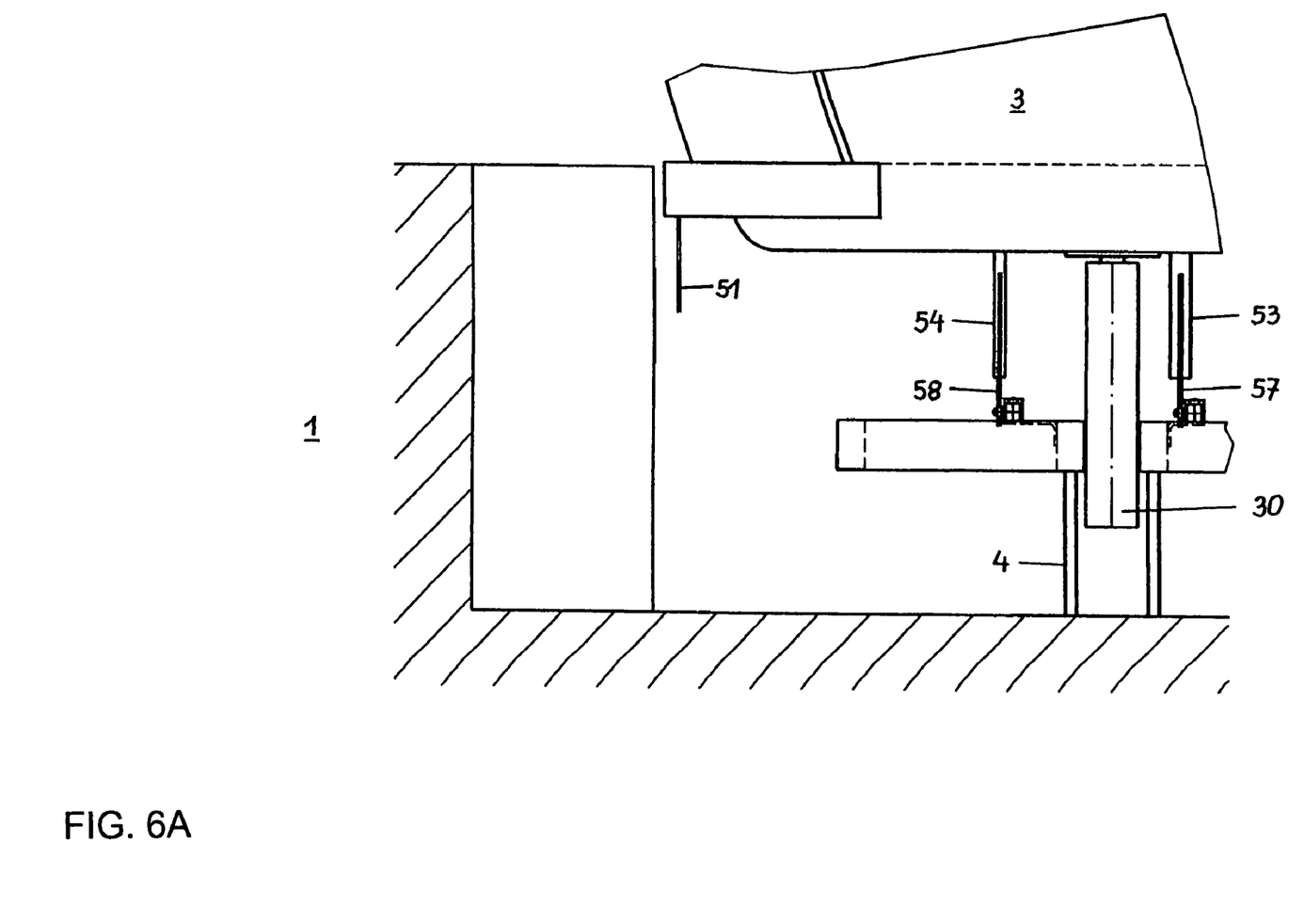
FIG. 6A is an enlarged view of detail VII in FIG. 2.

As can be appreciated from FIG. 6, the stop 52 in the exit area projects from a side wall of the foundations of the cableway station 1, in conjunction with which it is capable of being displaced by means of a drive 52a. In a first position of the stop 52, this is situated laterally outside the movement path of the switch bar 51, as a consequence of which no signal is caused to be generated by the switch bar 51 as the cableway gondola 3 travels past. In a second position of the stop 52, this is located in the movement path of the switch bar 51, so that the latter is caused to pivot by the passage of the cableway gondola 3, as a consequence of which a start signal is transmitted to the control unit 37 provided in the cableway gondola 3.

In this way, the cableway gondola 3 is caused to rotate as it leaves the station 1.

In addition, switch bars 55 and 56 project upwards from the guide rail 4, which are allocated to the switch bars 53 and 54 projecting downwards from the cableway gondolas 3. The switch bars 55 and 56 serve the purpose of verifying the rotational position of the cableway gondolas 3 in the event of their possible backward movement.

Figure 7:
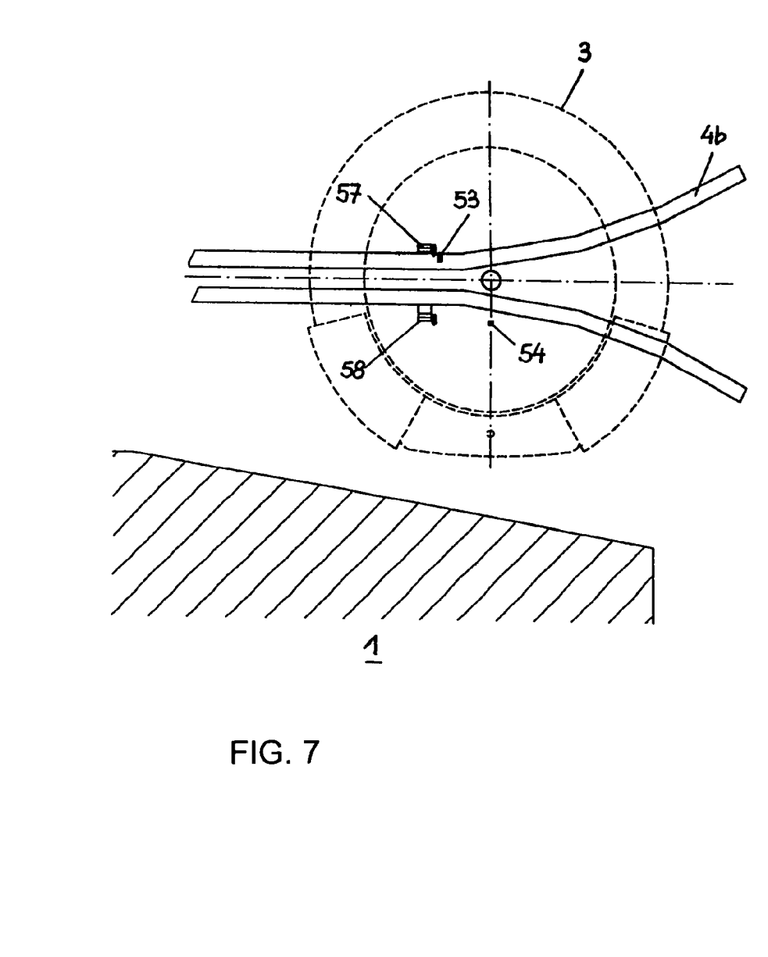
FIGS. 7 and 7A show details of FIG. 5, in two different rotational positions, of a cableway gondola entering a cableway station.

As can also be appreciated from FIG. 7, the second control elements provided in the entry area to the cableway stations 1 are formed by two switch rods 57 and 58, which are similarly capable of pivoting about horizontal axes and are allocated to the switch bars 53 and 54 projecting downwards from the cableway gondola 3. The switch bars 53 and 54 are situated at different distances from the axis of rotation of the cableway gondola 3 and at different angular positions in relation to the direction of movement of the cableway gondola 3. In order to ensure that the switch bars 53 and 54 perform identical functions at different rotational positions of the cableway gondolas 3, the switch bar 53, which is situated at a smaller distance than the switch bar 54 from the axis of rotation of the cableway gondola 3, is executed so that it is wider than the switch bar 53.

In conjunction with the entry of a cableway gondola 3 into one of the stations 1, signals are generated by two sensors to the effect that a cableway gondola 3 is entering, the rotational position of which must be verified. The switch rods 57 and 58 subsequently verify whether a rotational position of the cableway gondola 3 in accordance with the requirements is present. If this is found not to be the case, the cableway installation is switched off, whereupon the cableway gondola 3 can be caused to rotate manually in order to bring it into the rotational position wherein it can be left or boarded by the passengers in the station 1.

The functions of these two devices for actuating the rotational movement in conjunction with the exit of a cableway gondola from a cableway station 1, and for monitoring the rotational position of a cableway gondola 3 in conjunction with its entry into a cableway station, are as follows:

If the stop 52 is in the retracted, first position, as a cableway gondola 3 leaves the cableway station 1, the switch bar 51 allocated to this stop 52 will not be actuated, as a consequence of which no start signal will be given by this to the control unit 37 present in the cableway gondola 3. If, on the other hand, the stop 52 is in the advanced position, wherein it projects into the movement path of the switch bar 51, the switch bar 51 engages with the stop 52 as the cableway gondola 3 leaves the cableway station 1. The switch bar 51 is caused to pivot in this way, as a consequence of which the control unit 37 will generate a start signal for the turntable drive unit. The cableway gondola 3 is caused to rotate in this way during its movement from one station to a second station in a manner that is determined by a computer program.

Two full revolutions of the cableway gondola 3 can thus take place within a travelling time of 5 minutes, for example.

As an alternative, a radio control unit can be provided, by means of which the control unit 37 is actuated after the cableway gondola 3 has exited from the stations 1, as a consequence of which a start signal for the turntable drive unit is generated by this radio control unit to the control unit 37.

In conjunction with the entry of the cableway gondola 3 into a cableway station 1, which is detected by two sensors, the cableway gondola must enter the station 1 in a rotational position such that it can be left and boarded by passengers. Present for this purpose in the entry area of the cableway station 1 is the aforementioned detector device, which serves the purpose of verifying the rotational position of the cableway gondola 3 as it enters the station. If the cableway gondola 3 exhibits a rotational position corresponding to the requirements, as illustrated in FIG. 7, in conjunction with which a tolerance of ±5° is permissible, the two switch rods 53 and 54 will engage with the switch bars 57 and 58 that are allocated to them, as a consequence of which a control signal will then be generated by these two switch bars 57 and 58 to the effect that the cableway gondola 3 is in the rotational position required for entry into the station 1.

Figure 7A:
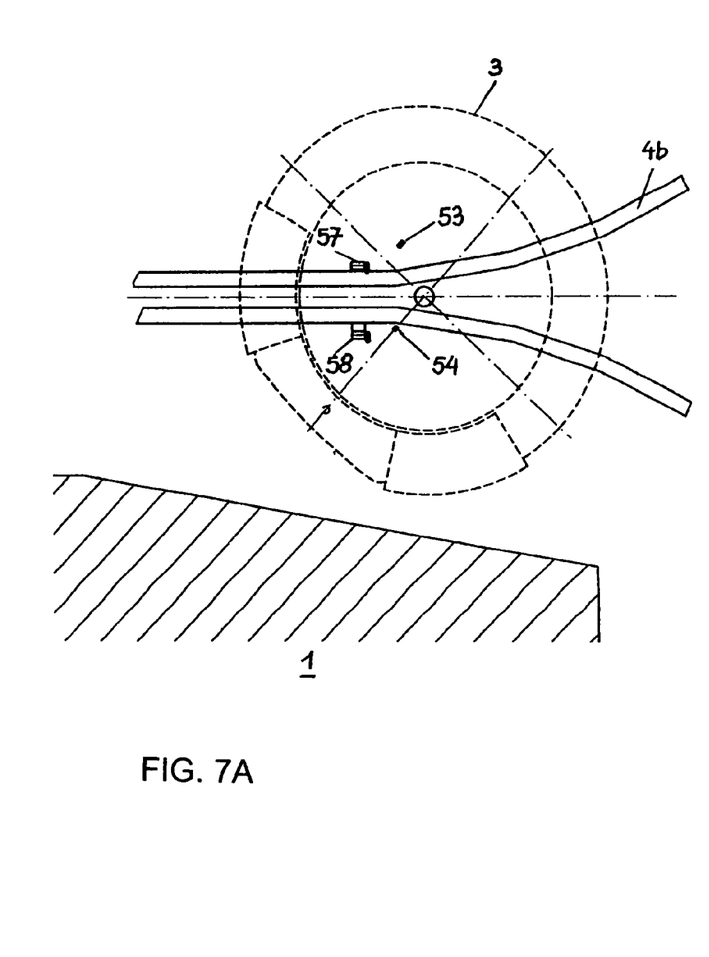

If, on the other hand, as represented in FIG. 7a, the cableway gondola 3 is in an incorrect rotational position at the time of its entry into the station 1, only one of the two switch bars 57 and 58, or neither of these, will be actuated, as a consequence of which a signal will then be given to the drive system of the cableway installation to the effect that this will be switched off. It will then be necessary to adjust the cableway gondola 3 manually to the correct rotational position.

If the cableway gondola 3 enters one of the stations 1 in a position wherein it is displaced through 180°, no actuation of the switch bars 57 and 58 will similarly take place for this reason, since the switch rods 53 and 54 are situated at different distances from the axis of rotation of the cableway gondola 3, as a consequence of which they will travel past the switch bars 57 and 58. In this case, too, the drive for the cableway installation will be switched off, and the cableway gondola 3 will require to be caused to rotate manually.

The switch bars 55 and 56 provided in the exit area perform the same function as soon as the cableway gondolas 3 are moved backwards into the station 1.

A cableway installation is thus made available, wherein the cableway gondolas are capable of being caused to rotate in the course of their travel over the section, and wherein the adoption by the cableway gondolas as they enter the cableway stations of the rotational position required to enable the passengers to leave and board is monitored. exclusive rights This application claims the priority, under 35 U.S.C. § 119, of Austrian patent application A 1583/2005, filed Sep. 27, 2005; the prior application is herewith incorporated by reference in its entirety.

We claim:

1. A cableway installation, comprising:
a suspension and hauling cable guided about deflector pulleys in stations of the cableway installation;
transport devices attached to said suspension and hauling cable via respective suspension rods, said suspension rods being configured to be selectively disconnected from said suspension and hauling cable in the stations;
guide rails disposed to guide said transport devices through the stations along exit and entry areas, for subsequent reconnection to the suspension and hauling cable;
a turntable drive unit disposed to enable said transport devices to be rotated relative to said suspension rods about a substantially vertical axis; and
a control unit disposed in a respective said transport device for controlling said turntable drive unit;
a detector device disposed in an entry area to the stations for monitoring a rotational position of said transport devices upon entering the stations and connected to cause the cableway installation to be stopped when a preset value for the rotational position of a transport device is exceeded; and
a first switching element disposed in an exit area from the stations, said first switching element being connected for actuating said control unit in conjunction with a departure of a respective said transport device from the stations, in order to switch on said turntable drive unit.

2. A cableway installation, comprising:
a suspension and hauling cable guided about deflector pulleys in stations of the cableway installation;
transport devices attached to said suspension and hauling cable via respective suspension rods, said suspension rods being configured to be selectively disconnected from said suspension and hauling cable in the stations;
guide rails disposed to guide said transport devices through the stations along exit and entry areas, for subsequent reconnection to the suspension and hauling cable;
a turntable drive unit disposed to enable said transport devices to be rotated relative to said suspension rods about a substantially vertical axis; and
a control unit disposed in a respective said transport device for controlling said turntable drive unit;

a detector device disposed in an entry area to the stations for monitoring a rotational position of said transport devices upon entering the stations and connected to cause the cableway installation to be stopped when a preset value for the rotational position of a transport device is exceeded; and a wireless control device configured to selectively actuate said control unit in conjunction with a departure of a respective said transport device from the stations, in order to switch on said turntable drive unit.

3. The cableway installation according to claim 1, wherein a first control element is mounted on said transport devices, said first switching element disposed in the exit area from the stations, upon projecting into a movement path of said first control element, causing said first control element to be displaced, whereupon a signal is generated to said control unit in the respective said transport device, wherein the signal causes a rotation of the respective said transport device.

4. The cableway installation according to claim 3, which comprises a positioning device associated with said first switching element in the exit area from the stations, said positioning device causing said switching element to be displaced into a first position outside the movement path of said first control element and into a second position inside the movement path of said first control element.

5. The cableway installation according to claim 4, wherein said positioning device is a stepping motor.

6. A cableway installation, comprising:

a suspension and hauling cable guided about deflector pulleys in stations of the cableway installation;

transport devices attached to said suspension and hauling cable via respective suspension rods, said suspension rods being configured to be selectively disconnected from said suspension and hauling cable in the stations;

guide rails disposed to guide said transport devices through the stations along exit and entry areas, for subsequent reconnection to the suspension and hauling cable;

a turntable drive unit disposed to enable said transport devices to be rotated relative to said suspension rods about a substantially vertical axis; and a control unit disposed in a respective said transport device for controlling said turntable drive unit;

a detector device disposed in an entry area to the stations for monitoring a rotational position of said transport devices upon entering the stations and connected to cause the cableway installation to be stopped when a preset value for the rotational position of a transport device is exceeded; and at least one switching element mounted to a respective one of said transport devices, and a control element disposed in the entry area to the stations and allocated to said switching element, and wherein said switching element interacts with said control element in a given rotational position of the respective said transport device.

7. The cableway installation according to claim 6, wherein said transport devices formed with a turntable drive unit include two said switching elements, and wherein a control element in each case is allocated to each of said switching elements in the entry area to the stations.

8. The cableway installation according to claim 1, which further comprises lower guide rails in a vicinity of a station floor, for guiding said transport devices through the stations.

9. The cableway installation according to claim 7, wherein said transport devices each includes at least one guide roller configured to roll on a guide rail in the stations.

10. The cableway installation according to claim 9, wherein said guide roller projects downwards from a floor of the respective said transport device and interacts with said guide rail in the station.

11. The cableway installation according to claim 3, wherein said first control element is a switch bar projecting from said transport device and configured to pivot and causing a control signal to be generated to said control unit disposed in said transport device.

12. The cableway installation according to claim 7, wherein said switching elements are switch bars projecting downwards from said transport devices, and said control elements are disposed in a movement path of said switch bars in the entry area to the stations and are configured for actuation by said switch bars.

13. The cableway installation according to claim 1, wherein said transport devices are suspension gondolas.

14. The cableway installation according to claim 2, which further comprises lower guide rails in a vicinity of a station floor, for guiding said transport devices through the stations.

15. The cableway installation according to claim 2, wherein said transport devices are suspension gondolas.

* * * * *